United States Patent
Piett et al.

(10) Patent No.: US 8,516,122 B2
(45) Date of Patent: *Aug. 20, 2013

(54) EMERGENCY INFORMATION SERVICES (75) Inventors: William Todd Piett, Southborough, MA (US); Matthew A. Serra, Morristown, NJ (US)

(73) Assignee: Rave Wireless, Inc., Framingham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/530,393

(22) Filed: Jun. 22, 2012

(65) Prior Publication Data

US 2012/0258680 A1   Oct. 11, 2012

Related U.S. Application Data (62) Division of application No. 12/749,600, filed on Mar. 30, 2010.

(60) Provisional application No. 61/164,547, filed on Mar. 30, 2009.

(51) Int. Cl.
*G06F 15/173* (2006.01)

(52) U.S. Cl.
USPC ........... 709/226; 709/223; 709/224; 709/225; 709/229

(58) Field of Classification Search
USPC .......................... 709/223, 224, 225, 226, 229
See application file for complete search history.

(56) References Cited

U.S. PATENT DOCUMENTS

| | | | |
|---|---|---|---|
| 6,807,564 B1 | 10/2004 | Zellner et al. | |
| 7,995,998 B2 * | 8/2011 | Wright et al. | 455/414.3 |
| 2002/0059030 A1 * | 5/2002 | Otworth et al. | 702/19 |
| 2002/0072348 A1 * | 6/2002 | Wheeler et al. | 455/404 |
| 2002/0087634 A1 | 7/2002 | Ogle et al. | |
| 2003/0149526 A1 * | 8/2003 | Zhou et al. | 701/213 |
| 2004/0062371 A1 * | 4/2004 | Maropis et al. | 379/114.2 |
| 2005/0124318 A1 | 6/2005 | Jeon | |
| 2005/0151642 A1 * | 7/2005 | Tupler et al. | 340/539.18 |
| 2005/0159132 A1 * | 7/2005 | Wright et al. | 455/404.1 |
| 2005/0160183 A1 | 7/2005 | Valli et al. | |
| 2006/0205383 A1 * | 9/2006 | Rollender | 455/404.1 |

(Continued)

OTHER PUBLICATIONS i3 Stage 3 Public Review; Sections 4.1.14-4.1.15 (p. 55-56), 4.2 (p. 57), 5.2.2.5 (p. 107-108), 5.2.3 (p. 108), 5.10 (p. 169), 5.18 (p. 178-179), 7 (p. 184-209), 8 (p. 209-212).

(Continued)

*Primary Examiner* — Liangche A Wang
(74) *Attorney, Agent, or Firm* — Occhiuti Rohlicek & Tsao LLP

(57) ABSTRACT

A method for providing user data to an emergency service provider includes enrolling a user in an emergency information system, including configuring a communication device associated with the user to deliver an access identifier to an emergency service provider when the user contacts the emergency service provider using the communication device. The method also includes maintaining, in a data storage module of the emergency information system, a database including user data associated with the user. The user data is associated with the access identifier. The method further includes receiving, via a communication network linked to the emergency information system, an access request from the emergency service provider, the access request including the access identifier; and providing, via the communication network, at least some of the user data associated with the requested access identifier to the emergency service provider.

72 Claims, 5 Drawing Sheets

(56) References Cited

U.S. PATENT DOCUMENTS

| | | | |
|---|---|---|---|
| 2008/0319805 A1* | 12/2008 | Burke, Jr. | 705/5 |
| 2009/0035740 A1* | 2/2009 | Reed et al. | 434/265 |
| 2009/0132366 A1* | 5/2009 | Lam et al. | 705/14 |
| 2010/0050199 A1 | 2/2010 | Kennedy | |
| 2010/0223131 A1* | 9/2010 | Scott et al. | 705/14.53 |
| 2011/0060378 A1 | 3/2011 | Tuysserkani | |

OTHER PUBLICATIONS

NENA Standard for NG9-1-1 Additional Data.

* cited by examiner

Fig. 5B

EMERGENCY INFORMATION SERVICES

CROSS-REFERENCE TO RELATED APPLICATIONS

This application is a divisional application of U.S. Utility application Ser. No. 12/749,600, filed Mar. 30, 2010, which claims priority to U.S. Provisional Application Ser. No. 61/164,547, filed Mar. 30, 2009, the contents of which are incorporated herein by reference.

BACKGROUND

About 250 million 9-1-1 calls are made each year in the United States. Over 65% of all 9-1-1 calls originate from mobile phones, and that percentage is expected to increase as more households eliminate their landline phones. Further, additional modes of communication with 9-1-1 emergency centers are emerging such as text messaging and instant messaging (IM). 9-1-1 communications, referred to generically as "calls" regardless of the mode of communication, are routed to an appropriate public safety access point (PSAP) based on the caller's location. For instance, a 9-1-1 call from a mobile phone is routed to the appropriate PSAP based on the location of the mobile device as reported by its wireless service provider. In addition to connecting the emergency call to the dispatch center, 9-1-1 systems also provide the mobile phone caller's Automatic Number Identifier (ANI) and the cell tower location (or more accurate location information if available). Wireline (i.e., landline) calls are routed using the caller's ANI. The address associated with the wireline phone number is also presented to the dispatch center by using the ANI to query the Automatic Location Information (ALI) database maintained by telephone companies and/or 9-1-1 service providers.

The Caller Location Information (CLI) provided to the PSAP is normally integrated into any one of a number of computer systems, providing the operator with an onscreen display of the information returned by the ALI response. For wireline enhanced 9-1-1 (E9-1-1) calls, the caller's location is displayed as an address. For wireless E9-1-1 calls, the caller's location is presented as a set of coordinates reflecting an estimated location of the caller, sometimes also translated into the nearest dispatchable address. Not all PSAPs have both wireline and wireless E9-1-1 systems.

In the context of this disclosure, a "call" includes not only traditional wireline and wireless calls but also other forms of communication such as text messaging or instant messaging. The "caller" is anyone communicating with the PSAP via any supported communication method.

Some solutions deployed on current 9-1-1 infrastructure support displaying some level of personal information associated with either a ANI or fixed address. For instance, typical fields may include a caller's disabilities or hazards known to exist at a particular address, such as structural hazards, chemicals on site, or fire dangers (e.g., oxygen tanks) present at the address. Systems capable of providing such information are generally tied to a specific PSAP system or location and do not allow input or updating of information directly by citizens.

SUMMARY

In a general aspect, a method for providing user data to an emergency service provider includes enrolling a user in an emergency information system, including configuring a communication device associated with the user to deliver an access identifier to an emergency service provider when the user contacts the emergency service provider using the communication device. The method also includes maintaining, in a data storage module of the emergency information system, a database including user data associated with the user. The user data is associated with the access identifier. The method further includes receiving, via a communication network linked to the emergency information system, an access request from the emergency service provider, the access request including the access identifier; and providing, via the communication network, at least some of the user data associated with the requested access identifier to the emergency service provider.

Embodiments may include one or more of the following.

The access identifier includes a URI or a telephone number. The data associated with the user includes at least one of data characterizing the user and a pointer to data characterizing the user.

The method further includes selecting at least some of the user data based on access permissions associated with the user data or based on an aging score of the user data. Providing at least some of the user data includes providing a marker indicative of an aging score of the user data.

The method further includes receiving the user data from a source of the user data. The source of the user data includes at least one of the user, a communication service provider used by the user, and a third party data source associated with the user.

Receiving the access request includes receiving the access request periodically or when the user contacts the emergency service provider.

Enrolling the user includes configuring a plurality of communication devices associated with the user. The communication device is associated with a plurality of users. Enrolling the user includes validating the communication device associated with the user.

In another general aspect, a method for providing user data to a service provider includes enrolling a user in an emergency information system; maintaining, in a data storage module of the emergency information system, a database including user data associated with the user; maintaining, in the data storage module, data representative of access permissions associated with access to at least a portion of the user data; receiving, via a communication network linked to the emergency information system, an access request from the service provider; and providing, via the communication network, at least some of the user data to the service provider, including selecting the at least some user data on the basis of the data representative of access permissions.

Embodiments may include one or more of the following.

Enrolling the user includes accepting input associated with the access permissions. Selecting the at least some user data on the basis of the data representative of access permissions includes selecting the at least some user data based in part on an identity of the service provider. Selecting the at least some user data on the basis of the data representative of access permissions includes selecting the at least some user data based in part on the user data. The at least some user data is not provided in response to a communication from the user.

In a further general aspect, a method of managing user data in an emergency information system includes storing, in a data storage module of the emergency information system, user data associated with a user; assigning, using a data management module of the emergency information system, an expiration date to at least a portion of the user data; prior to the expiration date of the user data, sending, via a communication network linked to the emergency information system, a reminder to the user to update the user data; and based on an aging score of the user data, performing at least one of generating a warning to be displayed to the emergency service provider in conjunction with the user data and restricting access of an emergency service provider to the user data using the data management module of the emergency information system.

Embodiments may include one or more of the following.

Restricting access includes at least one of suspending an account associated with the user, deleting the account associated with the user, restricting emergency service provider access to all of the user data, and restricting emergency service provider access to a portion of the user data.

The method further includes receiving the user data from a source of the user data. The source of the user data includes at least one of the user, a communication service provider used by the user, and a third party data source associated with the user. Receiving the user data includes receiving updated user data. The method further includes sending a request for the user data to the source of the user data.

Sending the reminder to the user includes sending a plurality of successive reminders to the user. Sending the plurality of successive reminders to the user includes sending the plurality of reminders to the user with an increasing frequency. Sending the reminder to the user includes sending the reminder to the user via at least one of a text message, an email, or a voice message.

The user data includes at least one of an address associated with the user, medical records of the user, criminal records of the user, a physical description of the user, a photograph of the user, and emergency contacts of the user.

The systems and methods described herein have a number of advantages. A PSAP operator or other first responder is able to quickly and easily access additional or supplemental information about a caller that may be helpful to the operator's response. For instance, a caller's exact home address as registered in the system may help a first responder to more efficiently locate the caller in an apartment complex if the caller was calling from a mobile phone or communicating via instant messaging. Similarly, a physical description or photograph of the caller could help first responders to locate the caller in a crowded shopping mall. Such information could also be used by first responders to assist an Alzheimer's patient that wanders away from home and dials 9-1-1; the patient could be found and returned home if the first responders knew what the patient looked like and where his home was.

Some information may be relevant to both wireline and wired 9-1-1 callers. A list of the caller's medical conditions or previous 9-1-1 call dispositions may help the PSAP operator to gauge the urgency of the caller's situation and may help the first responders to anticipate the actions that may be needed once they arrive at the caller. Knowing that there are four residents, including two children, in a household would be helpful to fire fighters and paramedics in the event of a fire. Providing emergency contact information may help first responders identify individuals trusted by the caller in order to support further follow-up.

The ability to link location and other information to other forms of digital communication, such as SMS, MMS, or Instant Messaging applications, expands the realm of possible ways a person may contact 9-1-1 and be located by a PSAP operator and/or first responder. A caller may initially communicate with a PSAP via Instant Messaging (IM) and subsequently be located via a Global Positioning System (GPS) in his mobile phone or via an address registered to the caller's emergency information system account.

The systems and methods described herein also provide a way to collect user data from multiple sources and devices and to maintain that data up-to-date. Information for all the devices belonging to or used by a user can be stored in a single location; the user does not have to maintain information in multiple locations for multiple devices. Aggregated data is presented quickly and in an organized manner to PSAP operators or first responders. The user is empowered to add, confirm and update data as needed via computer-based, interactive voice response (IVR)-based, or mobile phone-based user interfaces. Processes for maintaining currency of the data ensure that up-to-date information is presented to PSAP operators or first responders.

The systems and methods described herein provide a way for a user's information to be shared across multiple geographically disparate PSAPs or IP-based public safety networks (also known as Emergency Services IP networks, or ESINETs). That is, the stored information is not limited to only one physical PSAP location. Sharing rules and permissions based on attributes of the user's data (e.g., a category of the data) can define which PSAPs are allowed to see which data. Access permissions can be set by the user or by the emergency information system on the basis of attributes of the user and/or attributes of the entity to whom the data is displayed (e.g., a PSAP operator or a first responder). User data is held in escrow for the user, and the user has the ability to control storage of and access to his or her personal data.

Other features and advantages of the invention are apparent from the following description and from the claims.

DETAILED DESCRIPTION

Figure 1:
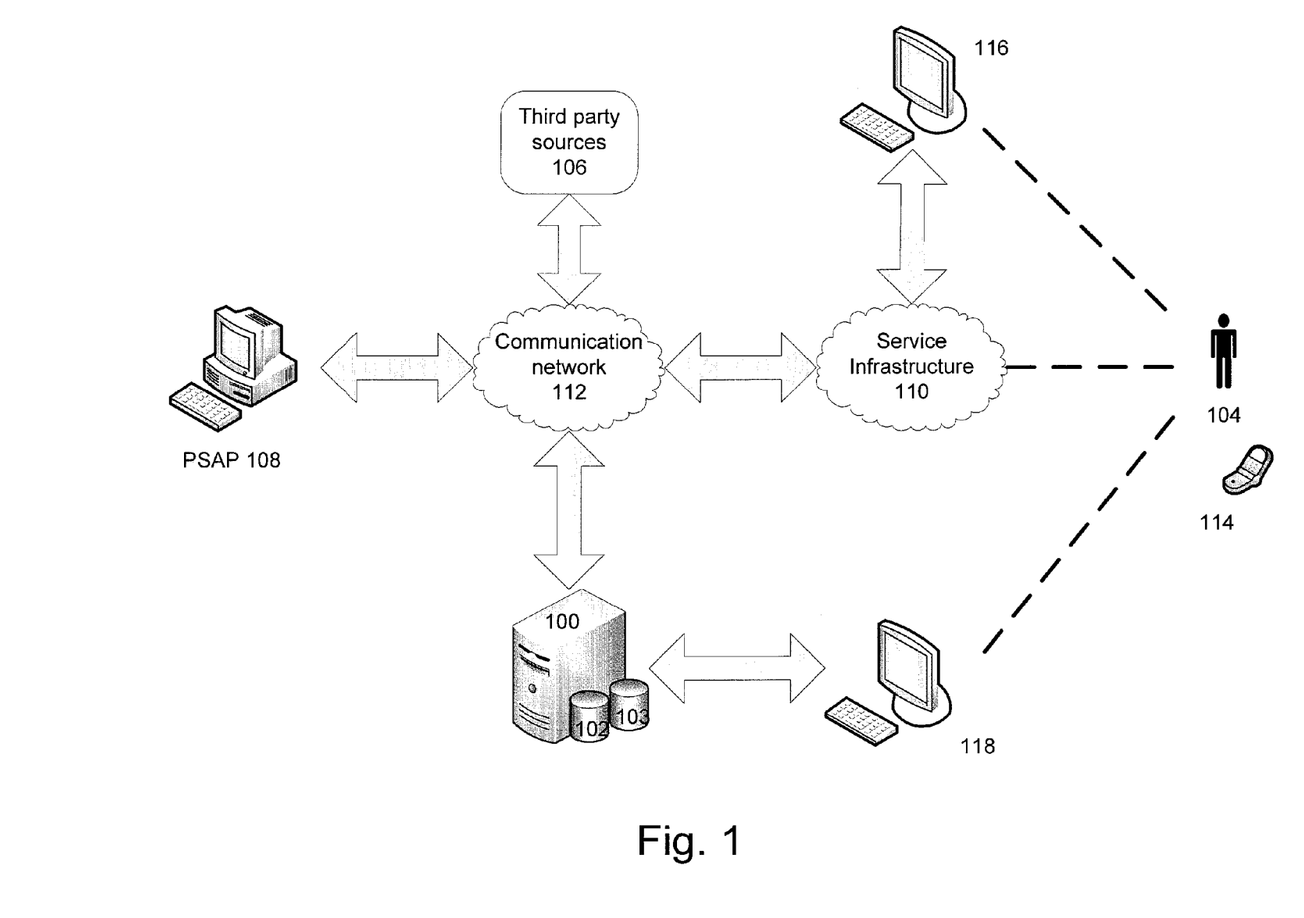
FIG. 1 shows an emergency information system.

Referring to FIG. 1, an emergency information system 100 stores personal information associated with a plurality of users 104 in a database 102. The database may include information reported by each user 104, such as medical conditions, emergency contacts, or a physical description. The database may also include information collected from a variety of third party sources 106, such as a billing address associated with the user's mobile phone carrier, the user's electronic health records, or a driver's license photograph of the user. The database may also include references or pointers to data stored in third party or user-generated databases which can be dynamically accessed based on permissions and authorizations given by the user and maintained in the database. Within database 102, each user's personal information is cataloged by the user's mobile phone number or any combination of other unique identifiers (e.g., an instant messenger (IM) ID, wireline phone number, unique device ID, etc). In some embodiments, a user's personal information is associated with several identifiers corresponding to, for instance, a personal mobile phone, a work-issued mobile phone, a landline home phone, and an IM ID. In other embodiments, multiple users are associated with a single identifier, such as in the case of a landline phone used by several members of a family. The database 102 may be maintained as a national, regional, or local database. In some embodiments, emergency information system 100 includes an access permissions database 103 that stores information related to access permissions or rules associated with user data stored in database 102.

When a user dials 9-1-1 (or contacts 9-1-1 via another method, such as via text message or instant messaging (IM)), the call is received by service infrastructure 110 of the user's mobile phone service provider and sent through a communication network 112. The call is then routed to a public service access point (PSAP) 108 based on the location of the user and any routing rules associated with the 9-1-1 service. In other embodiments, the call may be received and routed by an Emergency Services IP Network (ESINET).

The user's information stored in database 102 or referenced based on permissions stored in database 102 is accessible by an operator at the PSAP and may be useful to the operator, first responders, emergency room personnel, or other emergency service providers in responding to the user's emergency. For instance, a billing address associated with the user's mobile phone may be useful in pinpointing the location of the user. As another example, a list of self-reported medical conditions may help first responders to estimate the urgency of the user's situation and to anticipate treatments that may be necessary at the scene of the emergency.

In some embodiments, when the call is received by an ESINET, the ESINET may access information from emergency information system 100. For instance, the language preference of the caller may be used by a routing engine in the ESINET to determine where to route the call or to auto-bridge in a translator when the call is connected to a PSAP.

1 User Information 1.1 Enrollment

In general, users can enroll in emergency information system 100 in a number of ways. In some cases, users may register directly through a user interface 116, such as a web application, mobile interface (e.g., a webenabled interface, multimedia messaging service (MMS), or short messaging service (SMS)), or Interactive Voice Response (IVR) system. Alternatively, a user may register via a website of the user's communication service provider (e.g., mobile phone or Internet service provider). In other cases, certain information characterizing the user is populated into the emergency information system on their behalf by an entity, such as a university, in possession of that data. Additionally, a parent or guardian may enroll a minor child in the emergency information system.

When the enrollment is user-initiated, emergency information system 100 confirms that the communication device and unique ID being registered are in possession of the user undergoing the registration process. In some instances, emergency information system 100 communicates directly with the device(s) being registered and requests some form of confirmation response from the device. Alternatively, the emergency information system may assume that the device is in possession of the registering user based on a trusted relationship with the service provider performing the registration on behalf of the user.

Figure 2:
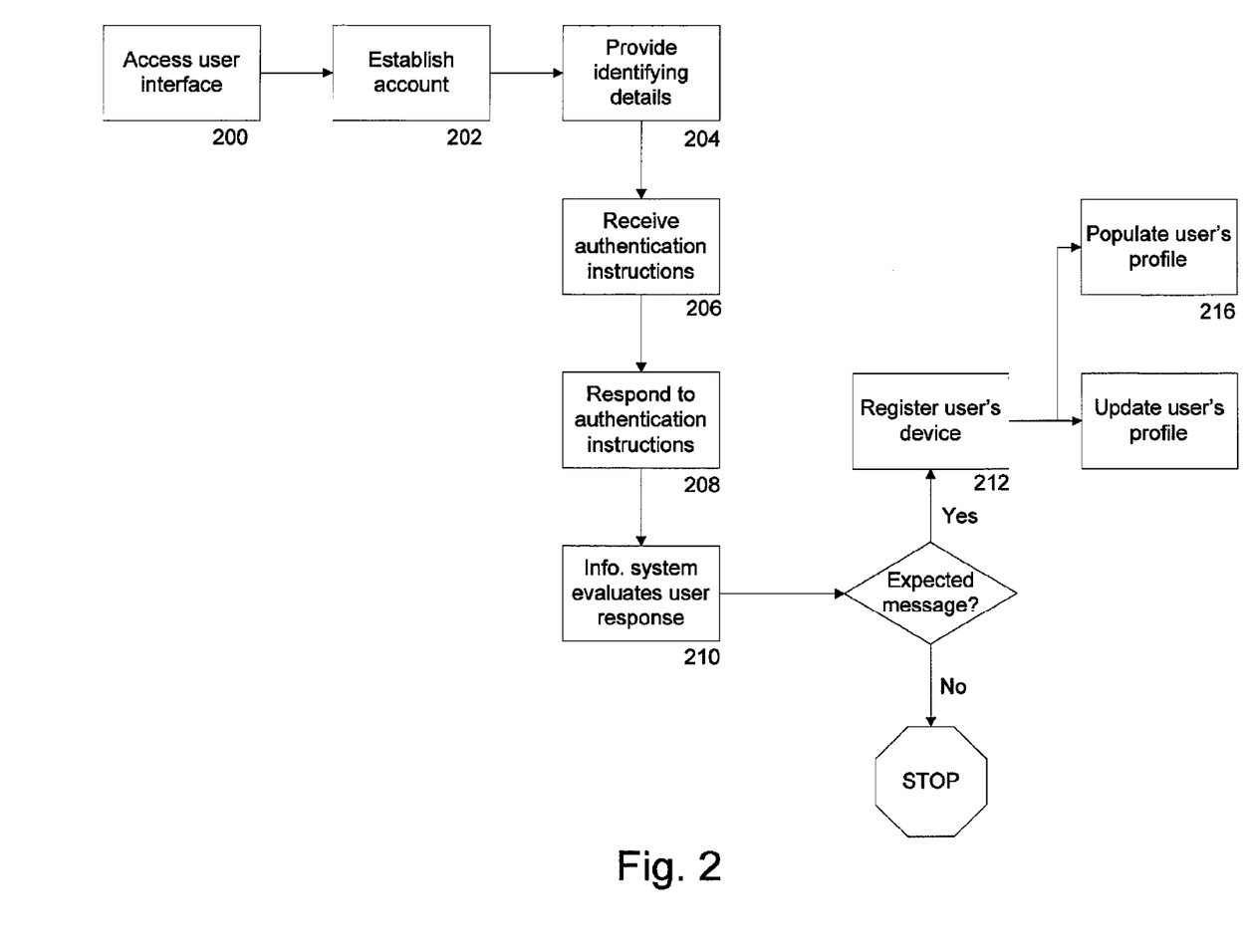
FIG. 2 is a flow chart of a user-initiated enrollment process.

Referring to FIGS. 1 and 2, in a user-initiated enrollment process, user 104 selects a particular emergency information system 100 with which to register a communications device or service. The following description will use the example of registering a mobile phone 114; however, it is to be understood that other types of communication devices or services, such as an IM account, may also be registered in a similar way. In some cases, the user may be directed to a particular emergency information system via a municipality-based initiative to enroll all residents in the emergency information system. The user accesses user interface 116 (step 200) and establishes an emergency information system account (step 202). In order to establish to account, the user provides details that uniquely identify the user's mobile phone, such as the phone number (step 204). In some cases, the user's mobile phone may present a set of enrollment forms to the user for the purposes of creating an account or for associating the phone with an existing account.

Emergency information system 100 stores preliminary information about the user's mobile phone service in the user's account and returns authentication data and/or instructions to the user (step 206). These instructions describe steps for the user to take to confirm ownership of the newly registered mobile phone. For instance, the user may receive a text message with a randomly generated secret PIN code or may be asked to respond to an automated voice notification message. The user confirms ownership of the registered mobile phone, for instance by sending the emergency information system a text message including the secret PIN code (step 208).

The infrastructure 110 supporting the user's mobile phone (e.g., the wireless network of the user's mobile phone service provider) sends the user's authentication response message to emergency information system 100 over communication network 112. Emergency information system 100 evaluates the message sent by the user (step 210). If the user's use of the mobile phone and/or the content of the user's message agree with data expected by the emergency information system 100, the mobile phone is registered (step 212). Emergency information system 100 updates the user's profile in the database 102 to associate the newly registered device with the user (step 214). The user's service provider may also provide basic information (e.g., name, billing address) to emergency information system; other user information may be provided as described below (step 216). At this point, subsequent use of the registered mobile phone to contact a PSAP or other emergency response organization having a relationship with emergency information system 100 will result in the user's profile being accessible or displayed to a PSAP operator.

In another embodiment, users may register their mobile phone directly with emergency information system 100 through a user interface 118, such as a web application, mobile interface (e.g., a web enabled interface, multimedia messaging service (MMS), or short messaging service (SMS)), or Interactive Voice Response (IVR) system. When a user accesses the user interface, the user's ownership of the mobile phone is verified through a combination of passwords and phone number validation such as the authentication methods described above (e.g., an SMS message including a PIN code is sent to the user's phone). In some cases, a trusted relationship is also established between the user's service provider and the emergency information system. Such a relationship may be established, for instance, by a background configuring text message or a Wireless Application Protocol (WAP) push of configuring information from emergency information system 100 to the user's mobile phone. Upon confirmation of ownership, the mobile phone is registered with emergency information system 100 and the user's service provider is enabled to provide basic information to the system.

Figure 3:
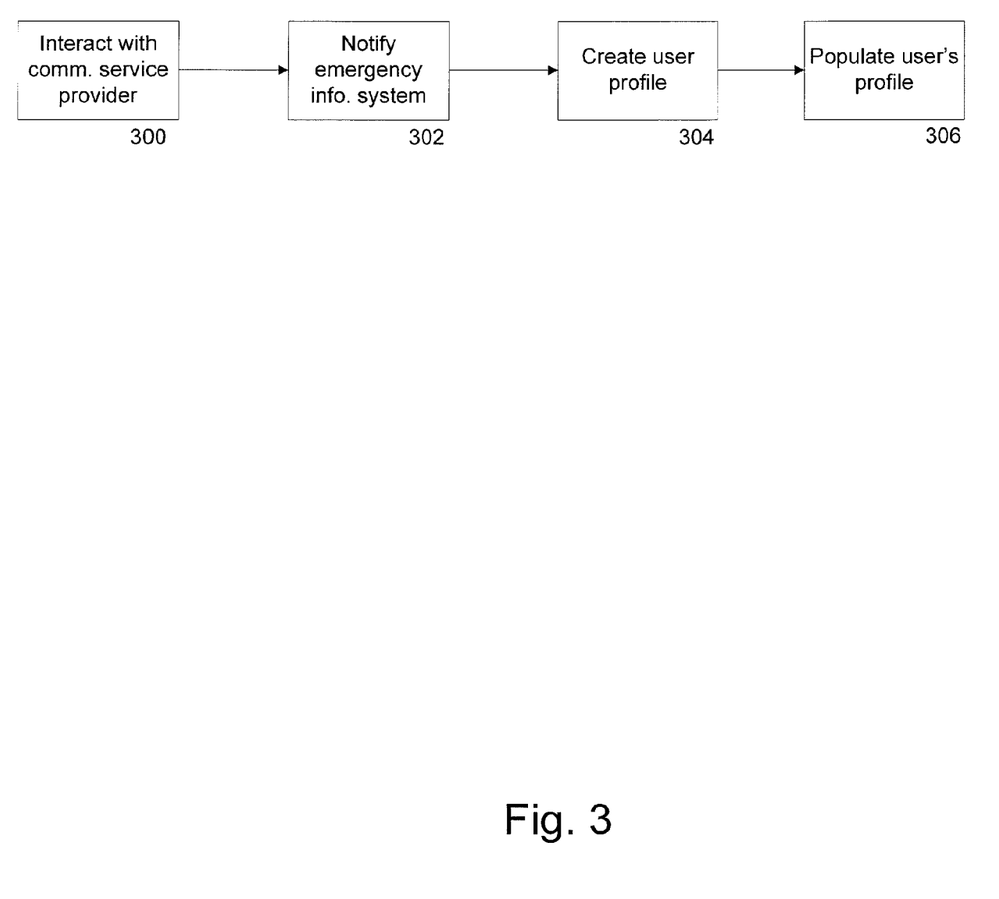
FIG. 3 is a flow chart of a prompted enrollment process.

Referring to FIGS. 1 and 3, in a prompted registration process, user 104 interacts with a provider of a communications service (e.g., a mobile phone service provider) that is eligible for registration with emergency information system 100 (step 300). This interaction may include the addition, modification, or cancellation of the communications service. During the interaction, the user is prompted to enroll (or to update a previously created account) in emergency information system 100. For instance, the user may be presented with a set of forms for the creation of an account or the addition of another communication device to the user's pre-existing account. A prompted registration program may be, for instance, a city-wide initiative to enroll all its residents in an emergency information system such that at least some emergency information is available about each resident. In such city-wide initiatives, the city has a contract with a particular emergency information system 100 and the user is not given a choice of emergency service provider.

The infrastructure 110 of the user's mobile phone service provider processes the user's request. Along with attending to the user's requests at the level of the service provider (e.g., initiation or cancellation of service or modification of the user's service contract), infrastructure 110 establishes a data connection with emergency information system 100 via communication network 112. The service provider notifies emergency information system 100 of the change in the user's service (step 302). In some cases, emergency information system 100 and the service provider have previously established a trusted relationship, e.g., via a background configuring text message or WAP push of configuring information to the user's communication device. Provided emergency information system 100 and the service provider have an established relationship, the emergency information system recognizes the incoming request as having originated from a trusted partner and creates a profile for the user (or updates a pre-existing profile) based on the information received in the incoming request (step 304). The user's profile may then be populated with information obtained from the user's service provider or as described below (step 306).

In other prompted registration processes, a user may enroll directly with emergency information system 100 as a result of a third-party prompt, such as an advertisement or a link from a city website. In this case, the enrollment process is similar to the user-initiated enrollment process described above.

In some embodiments, a third party is already in possession of certain information characterizing users affiliated with the third party. For instance, a university may already have collected information from enrolled students, including the students' dormitory address, class schedule, emergency contact, and phone number. Because such information is owned by the university (i.e., the information was voluntarily provided to the university by the student), the university may enroll the students in emergency information system 100 without explicit permission from each student. However, the stored information may be accessed only by a PSAP affiliated with the university, unless a student grants permission for other entities (e.g., PSAPs of surrounding municipalities) to view his or her information, as discussed in greater detail below.

1.2 Collection of User Data

Emergency information system 100 collects user information from a variety of sources, including directly from the user and from third parties such as mobile phone service providers and other record-keeping entities.

Upon registration of the user's mobile phone, emergency information system 100 is provided with the user's full name and billing address, either by the user or by the user's mobile phone service provider. Referring again to FIG. 1, during an initial provisioning process following registration, the service provider collects additional information from the user 104, such as emergency contacts, height, weight, age, gender, relevant medical information, alternate addresses (e.g., a dorm address different than the user's billing address), or photographs of the user, via user interface 116. The information provided by user 104 is forwarded to emergency information system 100 via the service provider's communications infrastructure 110. Alternatively, the user may provide information directly to emergency information system 100 through user interface 118. User-provided information may be in any of a variety of formats, including text, images, and audio or video files. The user is also prompted to accept the terms and conditions of use associated with emergency information system 100 and to define data sharing rules and access permissions (described in greater detail below).

Emergency information system 100 may also pull data from other data stores of which the user confirms ownership and which the user allows the emergency information system to access. For instance, the user's electronic medical records, class schedules, or vehicle registration information may be collected from the appropriate third party sources 106. The emergency information system may also communicate with law enforcement databases to obtain information such as restraining orders in which the user is named or the user's history of arrests or convictions. Additionally, emergency information system may collect data from PSAPs 108 related to historical PSAP case and disposition information associated with the user. For instance, a user may have recently made frequent calls for domestic abuse in various jurisdictions. This information may be collected through a user interface, or automatically from other systems in use at the PSAP.

In some cases, emergency information system 100 collects user-generated content at or near the time of the user's 9-1-1 call. For instance, data such as location information or real-time or recently updated health records may be retrieved in real time.

In some embodiments, the amount of information maintained in database 102 differs based on subscription level of the user. For instance, certain basic information (e.g., a user's address and gender) may be stored for a user having a basic subscription, while additional information is stored only for a user having a premium subscription.

1.3 Access Permissions

In some instances, a set of rules may govern the data that emergency information system 100 is permitted to store or display. Access permissions may be user-defined or system-defined and relate to the nature of the information and/or the role of the person who may access the data. Access permissions may be set with varying levels of granularity in order to allow or restrict access to a broad or narrow set of data or a broad or narrow set of emergency service providers.

In some cases, emergency information system 100 may have permission to store a user's current medications but not his past medical history (or to access such information in a third party medical records database).

In other cases, a full set of information may be stored or referenced in emergency information system, and user-defined or system-defined permissions govern what data is shown in certain circumstances. For instance, a user may allow ambulance technicians and emergency room personnel to access his medical records, but deny access to that information for police and PSAP operators. As another example, in the university-based enrollment system described above, a student may set permissions such that only the university PSAP can access his course schedule, but any emergency responder can access his allergy information and emergency contact information.

1.4 Maintenance of User Data

User information is expected to change frequently. For instance, a user's mobile phone account may be cancelled, telephone number ported to a new service provider, or instant messaging ID changed. In addition, other information, such as a user's address, medical history, or criminal record, may change. In order to ensure that the information presented to the PSAP is current, emergency information system 100 provides mechanisms that enable the updating of user information. Users may enter updates via their service provider (i.e., via user interface 116) or directly via user interface 118 to emergency information system 100, for instance to report a change in medical conditions (e.g., a major surgery, newly developed allergy, recent disease diagnosis, or change of primary care doctor or insurance provider). The user's communications service provider may also contact emergency information system 100, for instance to update a user's billing address. Emergency information system may periodically outreach to third party data stores, such as electronic medical records or class schedules, in order to collect updated information from these sources. Additionally, emergency information system 100 may receive updates from law enforcement databases and 9-1-1 call logs periodically or when information related to the user has changed. The PSAP or other responding entity may also update information directly in emergency information system 100. For example, a 9-1-1 operator may annotate that the caller made a prank call or that the caller's primary language is Spanish.

Referring again to FIG. 1, a variety of real-time event-based triggers may be used to update a user's profile on emergency information system 100. For instance, when user 104 calls 9-1-1 for an emergency, PSAP 108 responds to the user's request for assistance. A record of the activity related to handling and closing the user's case is forwarded to emergency information system 100 via communication network 112, where the user's profile is updated to include the new case information. In another instance, information about the user may be updated within one of the linked third party information systems 106, such as a health care provider. If the update is determined to be relevant (e.g., by the third party data provider) to the user's profile in emergency information system 100, the third party data provider authorizes disclosure of the update to emergency information system 100. The update is forwarded to the emergency information system via communication network 112, where the user's profile is modified to include the updated information. In still another instance, the user 104 uses or modifies his communications service in a way deemed relevant (e.g., by the communication service provider) to the user's profile in emergency information system 100. Communications service infrastructure 110 sends a message to emergency information system 100 via communication network 112 with the updated user information.

In some embodiments, emergency information system 100 periodically prompts users to update their personal information. Update reminders can be communicated to a user via email, SMS, instant messaging, or voice messages, as well as through messages on touch points of the user's service provider or another affiliated third party (e.g., a printed bill; a customer support website; or a federal, state, or municipal website). In some cases, the update reminders increase in frequency if a user does not update his information or confirm that the stored information is accurate. Ultimately, if a user does not update or confirm the accuracy of the stored information by an expiration date of the information, the user's account may be suspended or deleted. If the user's account has been suspended or deleted, the information displayed at the PSAP may be specifically annotated as being out of date. In some instances, no information will be displayed at a PSAP for a user with a suspended or deleted account. In other instances, only some information is displayed for a user with a suspended or deleted account. For example, a set of rules may determine that a user's name and billing address are the only data that are displayed.

In some embodiments, a user's personal information is subject to an aging process. A date on which the user last updated the information or confirmed that the information was current is used to time stamp the data. If the user calls 9-1-1, the PSAP operator views the user's personal information along with an associated aging score determined based on the time stamp of the data. The aging score helps the operator to understand whether the displayed information is current or out of date. A set of rules may determine which data are subject to such an aging process. For instance, a user's medical history may age more quickly than his billing address, while the user's gender does not age at all.

2 Providing User Information to a PSAP

Figure 4:
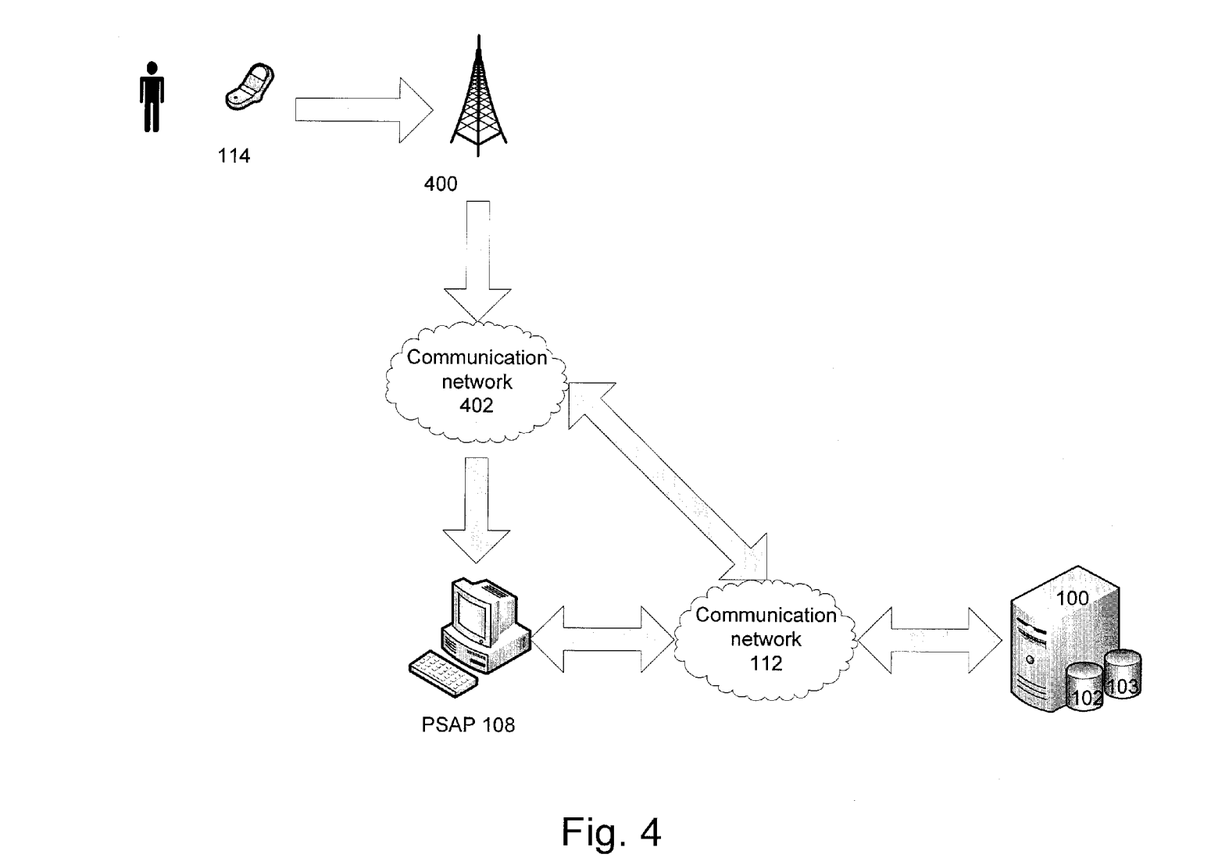
FIG. 4 is a schematic diagram of the operation of a PSAP.
Figure 5A:
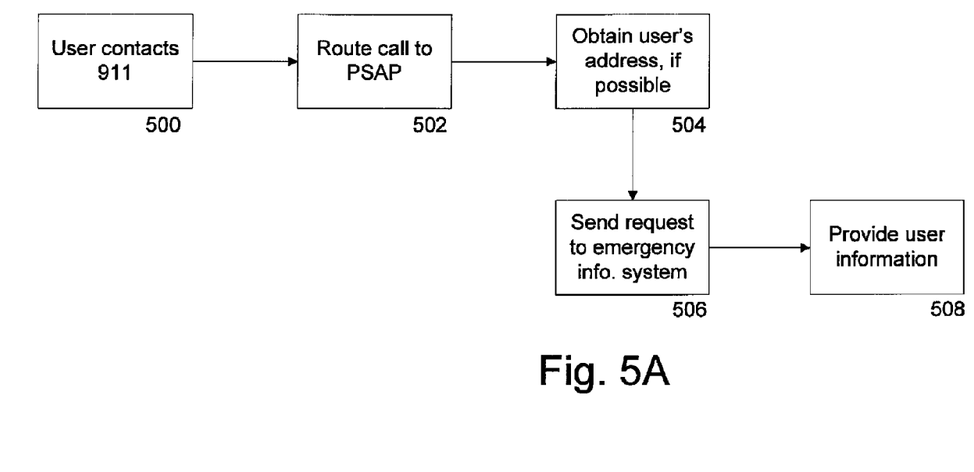
FIGS. 5A and 5B are flow charts of the processing of a 9-1-1 call.

Referring to FIGS. 4 and 5A, when a subscribed user 104 contacts 9-1-1 from the user's mobile phone 114 or other communications device or service (step 500), the call is connected to a wireless tower 400. The call is routed to an appropriate PSAP 108 (step 502) by a communication network 402, such as a Mobile Switching Center (MSC) or ESINET. A routing engine in the ESINET may connect to emergency information system 100 in order to obtain information about the caller that may be useful in routing the call. The user's Automatic Number Identifier (ANI) is passed to PSAP 108 and the phone number from which the user is calling from is displayed. Additionally, a computer-aided dispatch (CAD) or other end user system queries the Automatic Location Information (ALI) database to obtain the address associated with the user's telephone number, if available (step 504).

Concurrently with the ALI database query, a secure connection is established between the PSAP 108 and emergency information system 100 via communication network 112. The PSAP system sends a request to emergency information system 100 (step 506) including an identifier of the caller (e.g., the user's ANI or phone number, an instant messaging ID, or other identifier). In some instances, the identifier of the caller is hashed or otherwise obscured to maintain the caller's privacy. Emergency information system 100 provides its stored information associated with that identifier (step 508). In other embodiments, emergency information system 100 has a relationship with another data provider (e.g., an electronic medical records system). When the emergency information system 100 receives the PSAP's request, the emergency information system queries the data provider for any relevant information and provides that information to the PSAP. The data may be presented within the CAD system at PSAP 108 or may be displayed in a separate application. Alternatively, the information may be displayed at a mobile interface for use by first responders in the field. The information may be displayed as text, html, audio files, video files, or any other combination of data deliverable over an electronic connection.

Referring again to FIG. 4, in other embodiments utilizing IP-based call routing, the emergency services database 102 may be queried by the IP-based emergency services call handling network 402 prior to the call arriving at PSAP 108. The information returned by the database 102 may be then delivered with the call by the network 402 or otherwise utilized by the network in the call routing functions. Once the call arrives at PSAP 108, additional data available from the emergency services database 102 may be queried by a specific reference URI identifying the location of the data.

The above process of providing user information to a PSAP applies equally to callers contacting 9-1-1 via a landline telephone, an IM account, or any other supported means of communication.

Emergency information system 100 also provides the PSAP operator with the most recent location of the user by integrating into the location networks of mobile phone service providers and other service providers. This integration allows direct and intermediate location requests outside of the usual 9-1-1 rebidding process.

Figure 5B:
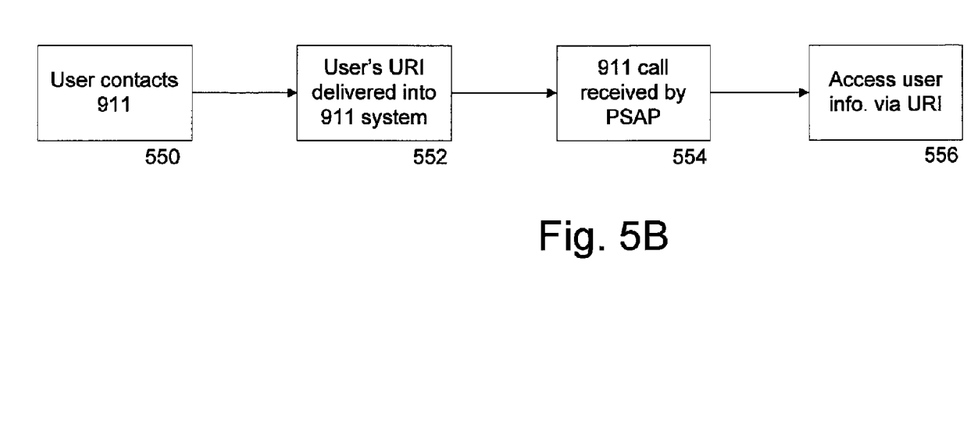

Referring to FIG. 5B, in another embodiment, when a user contacts a PSAP (e.g., when the user dials 9-1-1 from his mobile phone or other communication device; step 550), a uniform resource identifier (URI) for the user's emergency information provider is delivered into the 9-1-1 infrastructure along with the 9-1-1 call (step 552). When the 9-1-1 call is received by PSAP 108 (step 554), the PSAP operator can directly access the user's information stored in emergency information system 100 by following the URI (step 556). In this embodiment, the user's phone has been provisioned upon enrollment such that the phone is able to provide the URI when a 9-1-1 phone call is placed. Provisioning methods include pushing updates to the telephone via any standard mechanism (e.g., a background text message or a WAP push), associating the emergency information provider at the network level, or having the user follow a provisioning process for the telephone during service activation or enrollment. Alternatively, the phone number or another device-unique identifier can be appended to a URI that is entered on the device as a configuration option and used as a reference to the user's data stored in emergency information system 100. It is important to note that in this embodiment, access to the emergency information system is enabled prior to the call reaching the PSAP. This distinction may be relevant for determining a funding source for a subscription to emergency information system 100.

In some instances, emergency information system 100 includes a self-contained application that is stored locally and available without Internet access. This application may be useful if Internet access is unavailable or if data transfer from emergency information system 100 to the PSAP is slow. The self-contained application may include a copy of database 102 stored at the PSAP or at another location accessible to first responders. This local copy of the database is updated electronically from online database 102 at regular intervals.

In some embodiments, the PSAP interface to emergency information system 100 and any corresponding authentication mechanisms can grant discriminative access rights to different responders. For instance, a PSAP operator may need different information than a first responder on site. Alternatively, different jurisdictions may have access to different information. Emergency information system 100 also manages the accessibility of information if the initial request for information was not related to an emergency call (e.g., a detective with a warrant may be granted access to view historical case information across PSAPs, while a PSAP operator may have access only to a current case) or if the request for information was related to a device different than the device that initiated contact (e.g., the PSAP operator runs a query for the location of the user's mobile phone even though the initial contact with the user was via the user's landline phone). In another example, stored information that was provided or annotated by a specific PSAP may be viewable by all PSAPs and other entities or may be viewable only by other responders in the jurisdiction of the original PSAP. Access permissions may be established by the user, by an administrator of emergency information system 100, or by the emergency information system itself.

Access rights also relate to determining a user's location. For instance, a user may allow a PSAP to request the location of the user's mobile phone from the service provider for a certain time period (e.g., 45 minutes) after an initial 9-1-1 call. By explicitly giving permission to the PSAP to locate the user's mobile phone, the need for a subpoena for such information is obviated, enabling, for instance, real-time tracking of a user in an emergency situation. The location permissions and time period may be set on a per-device basis. Additionally, similar permissions may be set up for obtaining an IP address associated with a user's instant messaging account.

In some instances, permissions may be enabled to allow user information to be accessed outside of a 9-1-1 call, for instance if needed for public safety or public health issues. Users are prompted to enable the appropriate permissions in their account.

In some instances, the location request mechanism is operable directly through an emergency information system interface presented to the PSAP operator or first responder. In other cases, the location request mechanism is available via an interface requesting location information from another system (e.g., a CAD system). The location requests can happen during an 'active' communication session or outside of an active session. For instance, the request could be to identify the location of a mobile phone that sent an inbound 9-1-1 request via SMS or MMS. These location requests are made through emergency information system 100 to the mobile phone (or network supporting the mobile phone).

In some cases, the PSAP's request to emergency information system 100 aggregates different forms of communication. For instance, while the user may have communicated with the PSAP over instant messaging (IM), the user's profile in emergency information system 100 might match the user's IM ID to the user's mobile phone or landline, which can be used by a PSAP operator to contact the user. These cross-checking requests are only available when the user has specifically granted permission to emergency information system 100 to access the relevant information in the user's account, as discussed above.

It is to be understood that the foregoing description is intended to illustrate and not to limit the scope of the invention, which is defined by the scope of the appended claims. Other embodiments are within the scope of the following claims.

What is claimed is:

1. A method for providing user data to an emergency service provider, said method comprising: enrolling a user in an emergency information system, including configuring a communication device associated with the user to deliver an access identifier to an emergency service provider when the user contacts the emergency service provider using the communication device; maintaining, in a data storage module of the emergency information system, a database including user data associated with the user, the user data associated with the access identifier; receiving, via a communication network linked to the emergency information system, an access request from the emergency service provider, the access request including the access identifier; and providing, via the communication network, at least some of the user data associated with the requested access identifier to the emergency service provider, wherein the data associated with the user includes a pointer to data characterizing the user, thereby enabling access to said the data characterizing the user.

2. The method of claim 1, wherein the access identifier includes a uniform resource identifier.

3. The method of claim 1, wherein the access identifier includes a telephone number.

4. The method of claim 1, further comprising selecting at least some of the user data based on access permissions associated with the user data.

5. The method of claim 1, further comprising selecting at least some of the user data based on an aging score of the user data.

6. The method of claim 1, wherein providing at least some of the user data includes providing a marker indicative of an aging score of the user data.

7. The method of claim 1, further comprising receiving the user data from a source of the user data.

8. The method of claim 7, wherein the source of the user data includes at least one of the user, a communication service provider used by the user, and a third party data source associated with the user.

9. The method of claim 1, wherein receiving the access request includes receiving the access request when the user contacts the emergency service provider.

10. The method of claim 1, wherein receiving the access request includes periodically receiving the access request.

11. The method of claim 1, wherein enrolling the user includes configuring a plurality of communication devices associated with the user.

12. The method of claim 1, wherein the communication device is associated with a plurality of users.

13. The method of claim 1, wherein enrolling the user includes validating the communication device associated with the user.

14. A method for providing user data to a service provider, said method comprising: enrolling a user in an emergency information system; maintaining, in a data storage module of the emergency information system, a database including user data associated with the user, wherein the data associated with the user includes a pointer to data characterizing the user, thereby enabling access to said the data characterizing the user; maintaining, in the data storage module, data representative of access permissions associated with access to at least a portion of the user data; receiving, via a communication network linked to the emergency information system, an access request from the service provider; and providing, via the communication network, at least some of the user data to the service provider, including selecting the at least some user data on the basis of the data representative of access permissions.

15. The method of claim 14, wherein enrolling the user includes accepting input associated with the access permissions.

16. The method of claim 14, wherein selecting at least some user data on the basis of the data representative of access permissions includes selecting at least some user data based in part on an identity of the service provider.

17. The method of claim 14, wherein selecting the at least some user data on the basis of the data representative of access permissions includes selecting the at least some user data based in part on the user data.

18. The method of claim 14, wherein the at least some user data is not provided in response to a communication from the user.

19. A method for providing user data to an emergency service provider, said method comprising enrolling a user in an emergency information system, including configuring a communication device associated with the user to deliver an access identifier to an emergency service provider when the user contacts the emergency service provider using the communication device, maintaining, in a data storage module of the emergency information system, a database including user data associated with the user, the user data associated with the access identifier, at least some of the user data being based on an aging score of the user data, receiving, via a communication network linked to the emergency information system, an access request from the emergency service provider, the access request including the access identifier, and providing, via the communication network, at least some of the user data associated with the requested access identifier to the emergency service provider.

20. The method of claim 19, wherein the access identifier includes a uniform resource identifier.

21. The method of claim 19, wherein the access identifier includes a telephone number.

22. The method of claim 19, wherein the data associated with the user includes a pointer to data characterizing the user, thereby enabling access to said the data characterizing the user.

23. The method of claim 19, further comprising selecting at least some of the user data based on access permissions associated with the user data.

24. The method of claim 19, wherein providing at least some of the user data includes providing a marker indicative of an aging score of the user data.

25. The method of claim 19, further comprising receiving the user data from a source of the user data.

26. The method of claim 25, wherein the source of the user data includes at least one of the user, a communication service provider used by the user, and a third party data source associated with the user.

27. The method of claim 19, wherein receiving the access request includes receiving the access request when the user contacts the emergency service provider.

28. The method of claim 19, wherein receiving the access request includes periodically receiving the access request.

29. The method of claim 19, wherein enrolling the user includes configuring a plurality of communication devices associated with the user.

30. The method of claim 19, wherein the communication device is associated with a plurality of users.

31. The method of claim 19, wherein enrolling the user includes validating the communication device associated with the user.

32. A method for providing user data to an emergency service provider, said method comprising enrolling a user in an emergency information system, including configuring a communication device associated with the user to deliver an access identifier to an emergency service provider when the user contacts the emergency service provider using the communication device, maintaining, in a data storage module of the emergency information system, a database including user data associated with the user, the user data associated with the access identifier, providing a marker indicative of an aging score of the user data, receiving, via a communication network linked to the emergency information system, an access request from the emergency service provider, the access request including the access identifier, and providing, via the communication network, at least some of the user data associated with the requested access identifier to the emergency service provider.

33. The method of claim 32, wherein the access identifier includes a uniform resource identifier.

34. The method of claim 32, wherein the access identifier includes a telephone number.

35. The method of claim 32, wherein the data associated with the user includes a pointer to data characterizing the user, thereby enabling access to said the data characterizing the user.

36. The method of claim 32, further comprising selecting at least some of the user data based on access permissions associated with the user data.

37. The method of claim 32, further comprising selecting at least some of the user data based on an aging score of the user data.

38. The method of claim 32, further comprising receiving the user data from a source of the user data.

39. The method of claim 38, wherein the source of the user data includes at least one of the user, a communication service provider used by the user, and a third party data source associated with the user.

40. The method of claim 32, wherein receiving the access request includes receiving the access request when the user contacts the emergency service provider.

41. The method of claim 32, wherein receiving the access request includes periodically receiving the access request.

42. The method of claim 32, wherein enrolling the user includes configuring a plurality of communication devices associated with the user.

43. The method of claim 32, wherein the communication device is associated with a plurality of users.

44. The method of claim 32, wherein enrolling the user includes validating the communication device associated with the user.

45. A method for providing user data to an emergency service provider, said method comprising enrolling a user in an emergency information system, including configuring a communication device associated with the user to deliver an access identifier to an emergency service provider when the user contacts the emergency service provider using the communication device, maintaining, in a data storage module of the emergency information system, a database including user data associated with the user, the user data associated with the access identifier, periodically receiving, via a communication network linked to the emergency information system, an access request from the emergency service provider, the access request including the access identifier, and providing, via the communication network, at least some of the user data associated with the requested access identifier to the emergency service provider.

46. The method of claim 45, wherein the access identifier includes a uniform resource identifier.

47. The method of claim 45, wherein the access identifier includes a telephone number.

48. The method of claim 45, wherein the data associated with the user includes a pointer to data characterizing the user, thereby enabling access to said the data characterizing the user.

49. The method of claim 45, further comprising selecting at least some of the user data based on access permissions associated with the user data.

50. The method of claim 45, further comprising selecting at least some of the user data based on an aging score of the user data.

51. The method of claim 45, wherein providing at least some of the user data includes providing a marker indicative of an aging score of the user data.

52. The method of claim 45, further comprising receiving the user data from a source of the user data.

53. The method of claim 52, wherein the source of the user data includes at least one of the user, a communication service provider used by the user, and a third party data source associated with the user.

54. The method of claim 45, wherein receiving the access request includes receiving the access request when the user contacts the emergency service provider.

55. The method of claim 45, wherein enrolling the user includes configuring a plurality of communication devices associated with the user.

56. The method of claim 45, wherein the communication device is associated with a plurality of users.

57. The method of claim 45, wherein enrolling the user includes validating the communication device associated with the user.

58. A method for providing user data to a service provider, said method comprising enrolling a user in an emergency information system, maintaining, in a data storage module of the emergency information system, a database including user data associated with the user, at least some of said user data being selected based on an aging score of said user data, maintaining, in the data storage module, data representative of access permissions associated with access to at least a portion of the user data, receiving, via a communication network linked to the emergency information system, an access request from the service provider, and providing, via the communication network, at least some of the user data to the service provider, including selecting the at least some user data on the basis of the data representative of access permissions.

59. The method of claim 58, wherein enrolling the user includes accepting input associated with the access permissions.

60. The method of claim 58, wherein selecting at least some user data on the basis of the data representative of access permissions includes selecting at least some user data based in part on an identity of the service provider.

61. The method of claim 58, wherein selecting the at least some user data on the basis of the data representative of access permissions includes selecting the at least some user data based in part on the user data.

62. The method of claim 58, wherein the at least some user data is not provided in response to a communication from the user.

63. A method for providing user data to a service provider, said method comprising enrolling a user in an emergency information system, maintaining, in a data storage module of the emergency information system, a database including user data associated with the user, maintaining, in the data storage module, data representative of access permissions associated with access to at least a portion of the user data, receiving, via a communication network linked to the emergency information system, an access request from the service provider, and providing, via the communication network, at least some of the user data to the service provider, including selecting the at least some user data on the basis of the data representative of access permissions, wherein providing at least some of the user data includes providing a marker indicative of an aging score of the user data.

64. The method of claim 63, wherein enrolling the user includes accepting input associated with the access permissions.

65. The method of claim 63, wherein selecting at least some user data on the basis of the data representative of access permissions includes selecting at least some user data based in part on an identity of the service provider.

66. The method of claim 63, wherein selecting the at least some user data on the basis of the data representative of access permissions includes selecting the at least some user data based in part on the user data.

67. The method of claim 63, wherein the at least some user data is not provided in response to a communication from the user.

68. A method for providing user data to a service provider, said method comprising enrolling a user in an emergency information system, maintaining, in a data storage module of the emergency information system, a database including user data associated with the user, maintaining, in the data storage module, data representative of access permissions associated with access to at least a portion of the user data, periodically receiving, via a communication network linked to the emergency information system, an access request from the service provider, and providing, via the communication network, at least some of the user data to the service provider, including selecting the at least some user data on the basis of the data representative of access permissions.

69. The method of claim 68, wherein enrolling the user includes accepting input associated with the access permissions.

70. The method of claim 68, wherein selecting at least some user data on the basis of the data representative of access permissions includes selecting at least some user data based in part on an identity of the service provider.

71. The method of claim 68, wherein selecting the at least some user data on the basis of the data representative of access permissions includes selecting the at least some user data based in part on the user data.

72. The method of claim 68, wherein the at least some user data is not provided in response to a communication from the user.

* * * * *